United States Patent
Capozoli

[11] Patent Number: 5,825,322
[45] Date of Patent: Oct. 20, 1998

[54] METHOD AND APPARATUS FOR ROTATING AN ELECTRONICALLY-SCANNED RADAR BEAM EMPLOYING A VARIABLE-DWELL SCANNING PROCESS

[75] Inventor: Martin Stephen Capozoli, Ellicott City, Md.

[73] Assignee: AlliedSignal Inc., Morristown, N.J.

[21] Appl. No.: 64,569

[22] Filed: May 19, 1993

[51] Int. Cl.⁶ .................................................. H01Q 3/34
[52] U.S. Cl. ............................................ 342/37; 342/372
[58] Field of Search ................................. 342/37, 36, 32, 342/371, 372, 375, 376, 377, 74, 75

[56] References Cited

U.S. PATENT DOCUMENTS

| | | | |
|---|---|---|---|
| 3,727,218 | 4/1973 | Cantwell, Jr. et al. | 342/147 |
| 3,961,329 | 6/1976 | Naidich | 342/142 |
| 4,028,702 | 6/1977 | Levine | 342/374 |
| 4,134,113 | 1/1979 | Powell | 342/25 |
| 4,573,050 | 2/1986 | Waters | 342/157 |
| 4,642,649 | 2/1987 | Lightfoot | 342/458 |
| 4,675,678 | 6/1987 | Klingenschmitt et al. | 342/34 |
| 4,814,779 | 3/1989 | Levine | 342/375 X |
| 4,903,030 | 2/1990 | Maitre | 342/113 |
| 5,247,311 | 9/1993 | Sobocinski | 342/453 |
| 5,283,587 | 2/1994 | Hirshfield et al. | 342/372 |

*Primary Examiner*—John B. Sotomayor
*Attorney, Agent, or Firm*—Vern E. Kreger, Jr.

[57] ABSTRACT

A method and apparatus for controlling the scan rate of an electronically-scanned (E-scan) antenna (24) of a secondary radar system to provide a variable-dwell time for the E-beam (62) of the E-scan antenna (24) at selected scan angles. The secondary radar system operates in conjunction with a primary radar antenna (20) that scans at a constant angular rate throughout a scan cycle. The E-scan antenna (24) scans through any given azimuth sector at an approximately constant data rate, whereby the beam (62) remains in the azimuth sectors that have high-target densities (52) for extended periods of time and moves rapidly through azimuth sectors that have low-target densities (54).

20 Claims, 8 Drawing Sheets

METHOD AND APPARATUS FOR ROTATING AN ELECTRONICALLY-SCANNED RADAR BEAM EMPLOYING A VARIABLE-DWELL SCANNING PROCESS

FIELD OF THE INVENTION

The present invention relates, in general, to Air Traffic Control (ATC) radar systems. More particularly, it relates to a method for controlling the scan of an electronically-scanned, secondary radar antenna to provide a variable-dwell time as a function of the target density.

BACKGROUND OF THE INVENTION

The air traffic control system currently in international use is the Air Traffic Control Radar Beacon System (ATCRBS). ATCRBS combines the target responses produced by a primary surveillance radar with the target responses produced by a secondary surveillance radar. It provides the air traffic controller with a more complete picture of the traffic status within a controlled area than is available from a primary radar alone. The primary radar depends upon aircraft reflections of radar transmissions to indicate aircraft ranges and bearings. The secondary radar relies upon responses to interrogation signals by transponder (beacon) equipped aircraft to indicate range, bearing, altitude, and identity of such aircraft.

In the majority of ATCRBS installations, the primary radar antenna and the secondary radar antenna are mounted on the same pedestal for scan rotation by a common drive mechanism. In such installations, the scans of the primary radar beam and the secondary radar beam are synchronized, and the dwell times for both the primary and secondary radars are constant throughout a scan cycle. An improved form of ATCRBS is provided by replacing the mechanically-scanned secondary radar antenna with an electronically-scanned, circular-phased array antenna as described, for example, in U.S. Pat. No. 4,639,732, issued Jan. 27, 1987.

The electronically-scanned (E-scan) antenna is capable of shifting the beam pointing direction rapidly to any desired azimuth angle. The agility of the E-scan antenna has been used to provide more frequent updates of tracking information on priority targets, such as fast-moving or close range aircraft, than is available from mechanically-scanned (M-scan) antennas. When an update of information on a priority target is due, the search operation of the E-scan antenna is interrupted and the antenna beam is directed to the azimuth of the priority target. After the update is obtained, the antenna beam returns to the position at the time of the interruption and resumes its search operation.

This limited utilization of the dexterity of the E-scan antenna fails to exploit the full potential of the antenna. The benefits that an E-scan antenna can provide to primary and secondary radar systems are related to the data processing problems created by the characteristic, non-uniform distribution of targets in range and azimuth in the ATC environment. In addition, the Mode S data-link requirement intensifies the problems which target bunching and channel time already present to radar data processing.

Target bunching is a problem for radar data processing since it places peak data load demands upon the data processing resources. For a fixed-scan antenna, these peak data loads are directly proportional to target density. System design considerations for a fixed-scan system must take into account the appropriate balance between processor power, buffer size, and target report delay so as to ensure that all target bunching scenarios can be handled when the system is at full target capacity. In order to process peak data loads without excessive delay, a well designed ATCRBS includes excess data buffering and processing capacities.

Channel time is the amount of time available for RF data communications between the ground system and those aircraft within the sensor's active beam. In a fixed-scan system, this time is fixed and is a function of the scan rate and beamwidth. It has the same numerical value as antenna dwell time, but usually refers to the data link aspect rather than the surveillance aspect of the radar problem. Improved secondary surveillance radar systems perform both surveillance and data link transactions. Channel time defines the communication bandwidth within the active beam and determines the type and number of data link messages which may be sent or received within a given beamwidth. In a fixed-scan system, communication transactions which exceed the available channel time are either lost or delayed until the next scan. Message prioritization is used to ensure that the most critical messages are sent first. Channel time is independent of processing power in the sense that unlimited processing capability cannot compensate for insufficient communications bandwidth.

High traffic densities can also lead to garbling of the replies made by aircraft. Since all aircraft within the beam of an ATCRBS secondary radar respond to an interrogation signal by the ground system, replies by aircraft are often overlapped and undecipherable. An improvement to ATCRBS, known as Mode S, is now being implemented. Mode S provides selective addressing to target aircraft within the secondary radar beam, as well as data link communications with those aircraft. The selective addressing feature of Mode S eliminates unwanted replies, reducing the probability of message garbling and reduces channel time limitations on the traffic handling capacity of the system. However, when data link communications are conducted, reply messages are of greater length, and channel time limitations again influence the traffic handling capacity of the system.

Potential performance advantages of an E-scanned antenna over an M-scanned antenna are generally recognized. However, additional performance advantages can be realized for primary and secondary surveillance radar by implementing the variable-dwell scanning method disclosed in this patent. These advantages are evident in both general radar applications as well as in a Mode S addressable communication environment. In addition, a particular embodiment of the disclosed invention is adaptable to existing mechanically-based systems, and allows those systems to realize the aforementioned benefits with minimal impact to the existing hardware and software design.

SUMMARY OF THE INVENTION

The invention provides a method for controlling an electronically-scanned radar beam ("E-beam") that is capable of scanning a range of azimuth sectors so that the beam scans through any given azimuth sector at an approximately constant data rate, whereby the beam remains in the azimuth sectors that have high-target densities for extended periods of time and moves rapidly through azimuth sectors that have low-target densities. That is, the E-beam scans at a rate that provides constant data to the system rather than scanning at a constant angular rate.

The amount by which the dwell time of the E-beam is lengthened or shortened over the constant dwell time of the primary radar beam is dependent upon the time required to complete surveillance/communication transactions within a particular sector of the beam scan. The amount by which the dwell time is increased in high traffic density sectors is limited to a maximum value, and the amount by which the dwell time is shortened in low traffic density sectors is limited to a minimum value so that the average scan rate of the E-beam is made equal to the scan rate of the primary radar beam. Preferably, the azimuths of the E-beam and the primary radar beam coincide at the beginning and end of each scan cycle.

In an ATCRBS having a primary radar antenna and a secondary radar antenna that scan in synchronism at a constant angular rate, target reports are received by the primary radar system and by the secondary radar system at substantially the same times and azimuths. In this mode, the target reports from both radars are easily correlated using standard known procedures. In the present invention, however, procedures must be implemented for correlating the target reports from the constant rate primary radar and the variable-dwell secondary radar.

In the present invention, as a result of the lack of synchronization between the primary radar beam and the E-beam, a target report on a particular aircraft received by the primary and secondary radar will usually differ in the time of reception. In order to compensate, the range and azimuth of the target report from the primary radar is appropriately adjusted to allow the use of existing procedures for correlating the target reports from the primary and secondary radars.

Variable-dwell operation adapts the scan rate to the type of non-uniform target environment which is typical for air traffic control operations. Unlike the M-scanned primary and secondary radar beams, an E-scanned beam with variable-dwell provides a dramatic increase in processing efficiency by spending the appropriate amount of time, as determined by the surveillance/communication requirements, in each azimuth sector.

It is therefore an object of the invention to provide a method of controlling the scan of an E-scan antenna for a secondary radar of an ATCRBS by which method the dwell time of the antenna beam is varied during a scan cycle.

It is a further object of the present invention to provide a variable-dwell E-beam that conforms to the non-uniform target environment that is typical for ATC operation.

It is a further object of the invention to provide a method of controlling the scan of an E-scan antenna for a secondary radar of an ATCRBS that will reduce peak data loading of the system data processor.

It is another object of the invention to provide a method of controlling the scan of an E-scan antenna for a secondary radar of an ATCRBS that will increase the channel time for carrying out data transactions in sectors of the antenna scan having high air traffic densities.

It is still a further object to provide a variable-dwell E-beam that will provide the maximum degree of compatibility with existing systems.

One of the benefits of the present invention is that a variable-dwell E-scanned beam provides a dramatic reduction in peak data loading combined with a reduction in target report delay, independent of any target density. In terms of a new design, this benefit translates to reduced processing power requirements and/or a simplification in the software implementation of the required data processing. In terms of existing M-scan designs, this benefit would enable systems with insufficient processing power to meet full requirements and, alternatively, provide an added margin of safety to those systems which meet current requirements, thus allowing the accommodation of future increases in system demand.

A further benefit of the present invention is that variable-dwell E-scanned beams provide for the dynamic adjustment of channel time to match communication requirements on a real-time basis. This effectively increases the available communication bandwidth within the active beam to accommodate the desired number and kinds of messages between the aircraft and ground system.

It is still a further benefit of the present invention that a variable-dwell E-scanned beam is compatible with the Mode S data communication and preserves the investment in the hardware and software of that system.

BRIEF DESCRIPTION OF THE DRAWINGS

The above and other objects and benefits of this invention will be apparent on consideration of the following detailed description, taken in conjunction with the accompanying drawings, in which like reference characters refer to like parts throughout, and in which.

DETAILED DESCRIPTION OF THE INVENTION

Figure 1:
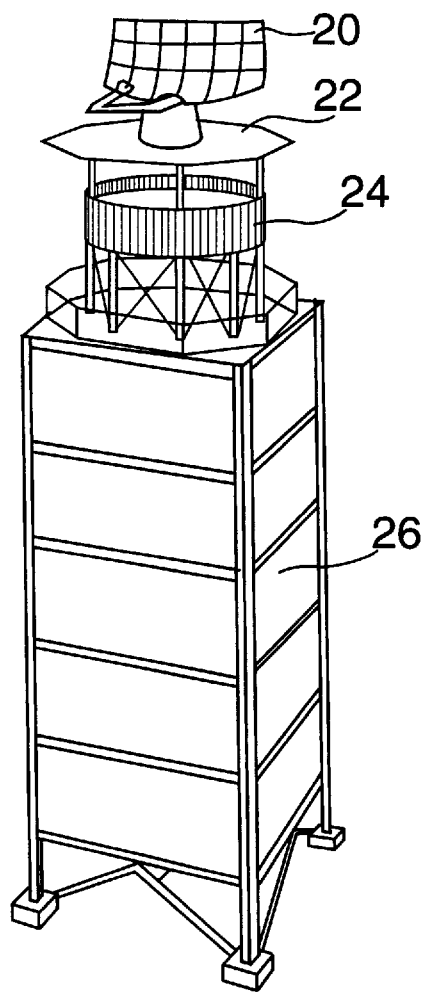
FIG. 1 is a pictorial representation of a mechanically-scanned primary radar antenna and an electronically-scanned secondary radar antenna ATCRBS installation.

Referring to FIG. 1, the primary radar antenna 20 is mounted on a pedestal 22 containing a mechanical drive for scanning the antenna 20 in azimuth. The secondary radar antenna 24 comprises a circular phased array positioned below the primary radar antenna 20 with the vertical axis of the phased array aligned with the scan axis of antenna 20. Antennas 20 and 24 are mounted atop a tower 26 to reduce the effects of ground reflections on the system performance. Antenna 20 may be scanned at a constant rate of 12.5 r.p.m. for terminal installations or at a lower rate for en-route installations. The width of the beam of antenna 20 is typically 2.4° between 3 dB points. Assuming a scan rate of 12.5 r.p.m., the time required for antenna 20 to scan through one beam width is 32 ms. One beam width may be considered to be scanned in four steps of 0.6° each, with a constant dwell time of 8 ms. per step.

The scanning of antenna 24 is electronically controlled by the settings of digital phase shifters (not shown), as is known in the art. Suitably, the phase shifters of antenna 24 are controlled to scan antenna 24 through 360° in 600 steps of 0.60° each. The width of the beam of antenna 24 is assumed to be 2.4°, but other beam widths may also be used. If the scan of antenna 24 was synchronized with the scan of antenna 20 throughout a scan cycle, the beam of antenna 24 would be advanced in azimuth one 0.6° step at uniform intervals of 8 ms. However, to provide the variable dwell times required by the invention, the beam of antenna 24 may be advanced in steps of 0.6° at non-uniform intervals.

Figure 2:
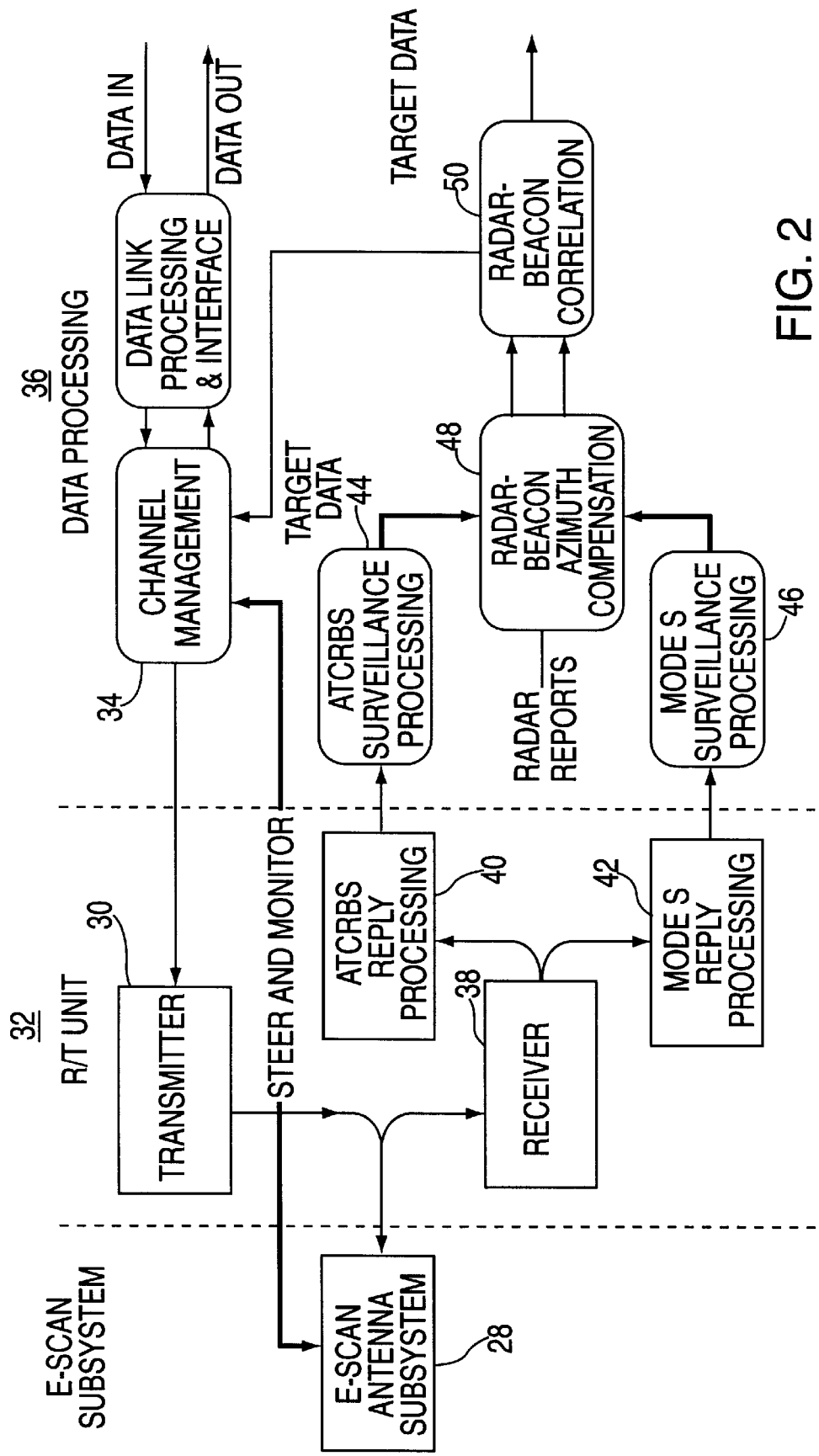
FIG. 2 is a simplified block diagram of the process elements of a secondary radar system.

FIG. 2 is a simplified block diagram of an ATCRBS-Mode S secondary radar system. Block 28 labelled "E-scan Antenna Subsystem" represents antenna 24 and its associated r.f. components and phase shifters. A transmitter 30 of R/T unit 32 furnishes antenna 24 with modulated r.f. signals for transmission as interrogation signals. The modulating signals for transmitter 30 that determine the nature of interrogating signals, i.e., ATCRBS mode A, mode C, or Mode-S all-call, roll-call and data, are supplied to transmitter 30 by a channel management section 34 of data processing unit 36. Other functions of channel management section 34 include providing steering commands to antenna 24; determining the times at which steering commands are issued to establish scan dwell times; and preparing, scheduling and updating communications transactions.

Replies to interrogation signals made by airborne transponders, frequently referred to as "beacons", are detected by a receiver 38 and decoded either by ATCRBS reply processing 40 or Mode S reply processing 42, as is appropriate. Processed replies from unit 40 are supplied to ATCRBS surveillance processing 44 for establishing a separate surveillance file for each ATCRBS target detected. Similarly, processed replies from unit 42 are fed to Mode S surveillance processing 46 for establishing Mode S surveillance files. The surveillance files contain information on target identity, azimuth, range, and a prediction of the target position on the next scan.

The primary radar, often referred to herein as the "radar", generates target reports on detected targets. The radar target reports contain information on the ranges and azimuths, but not identities, of the targets. In accordance with the invention, the azimuth of the secondary radar beam may lag behind the azimuth of the radar beam because of the variable dwell of the secondary radar beam. Such lag causes the target reports generated by the primary radar and the target reports generated by the secondary radar to differ in the times of generation, and possibly in azimuth due to target movement in the interval between the respective reports. The radar target reports and surveillance reports from unit 44 or unit 46, as appropriate, are applied to radar-beacon azimuth compensation unit 48 for adjustment of the azimuth contained in the surveillance reports in compensation for secondary radar beam lag. The radar reports and the azimuth compensated surveillance reports are then correlated in radar-beacon correlation unit 50 where the range and azimuth data of the radar target reports are compared with similar data of the surveillance reports, as adjusted by compensation unit 48. Target data from correlation unit 50 is furnished to channel management unit 34 for the purpose of establishing and updating the target track files maintained by unit 34.

A complete description of the ATCRBS-Mode S system, as implemented with M-scanned, constant dwell-time, primary and secondary radar antennas, is given in Federal Aviation Agency Specification No. FAA-E-2716. Copies are available to the public through the National Technical Information Service, Springfield, Va. 22161. Specification No. FAA-E-2716 includes a more complete description of the functions of channel management unit 34 and a full description of the algorithms used by unit 50 for correlation of radar-beacon target reports.

Figure 3:
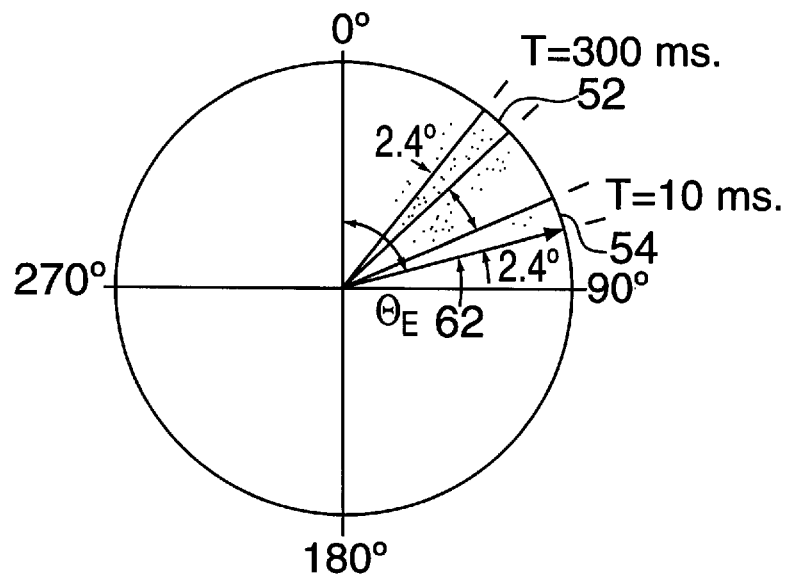
FIG. 3 is a graphical representation of the scan time characteristic of an electronically-scanned radar beam.
Figure 4:
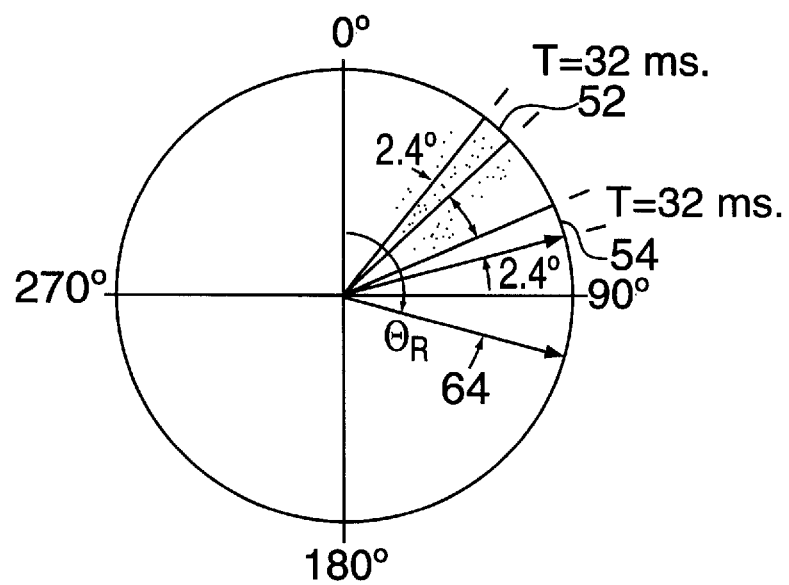
FIG. 4 is a graphical representation of the scan time characteristic of a typical mechanically-scanned radar beam.

FIG. 3 shows the operation of the variable-dwell E-scan antenna 24 through a portion of a scan cycle and FIG. 4 shows the corresponding operation of the constant dwell radar antenna 20. Initially, the E-beam 62 of Fig.3 and the radar beam 64 of Fig.4 coincide at 0° azimuth. Both beams scan in synchronism until a sector 52 is encountered containing a heavy concentration of aircraft. At that time, the dwell time of the E-beam 62 is lengthened, for example, to T=300 ms. to provide adequate channel time to conduct all required data transactions. After the E-beam 62 passes through sector 52 into areas of light traffic concentrations, such as sector 54, the dwell time of the E-beam 62 is shortened to a minimum value, suitably T=10 ms. This minimum dwell time provides sufficient channel time for ATCRBS operations while allowing the E-beam 62 to approach synchronism with the radar beam 64 which maintains a constant dwell time of 32 ms.

While the variable-dwell concept can be implemented within a scheme where the position of the E-beam depends upon the azimuth for the next target update, the preferred embodiment of the invention provides the maximum degree of compatibility with existing radar systems, and in particular, Mode S applications. This approach is to implement variable-dwell operation such that it simulates a hypothetical, variable-speed, mechanically rotating antenna. The amount of dwell time within a given azimuth sector is a function of the surveillance/communications activity within that sector. Therefore, the angular rate at which the beam is scanned will be adjusted as required. Two considerations in the implementation of a variable-dwell E-beam for a Mode S application are the potential variations in target update from scan-to-scan and the asynchronous nature of the secondary E-scanned beam with respect to the primary radar beam.

The first consideration results from the fact that although the target environment is unlikely to change substantially within one scan, communication requirements may change dramatically from one scan to the next, causing the update rate to change for some targets. In a mechanically-scanned system, the surveillance processing software will update the track file on a given target within some time delay following the generation of the target report for that target. The position of the target is predicted for the next scan assuming a fixed scan period and the predicted positions are entered into the track file. The track files are then arranged in earliest expected azimuth is order within the surveillance file.

Figure 5:
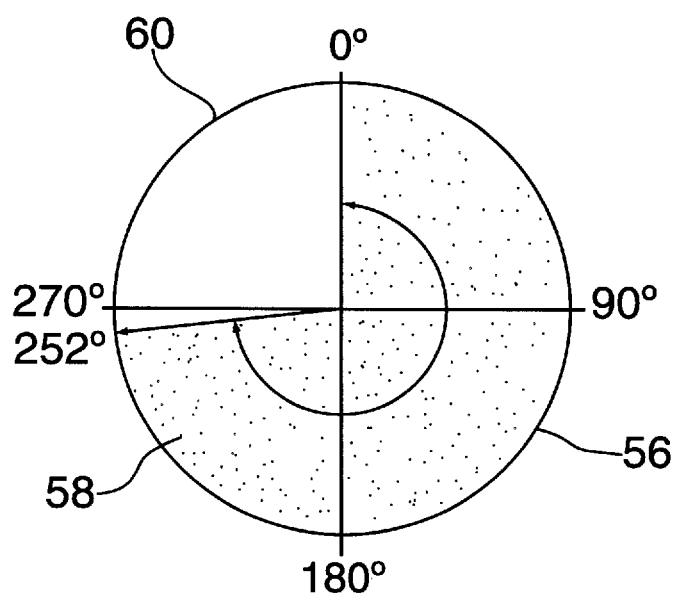
FIG. 5 is a graphical representation of the operational considerations of a variable-dwell, electronically-scanned beam with respect to scan-to-scan target predictions.

Since variable-dwell allows the update rate to change, a scheme must be provided to compensate for predicted positions based on a fixed overall scan period. FIG. 5 illustrates the operational considerations of a variable-dwell E-scanned beam with respect to scan-to-scan target predictions. Assume a steady state condition in which 700 targets are bunched within a 252° sector 56 with maximum data link activity. In this situation, the E-scanned beam moves from 0° to 252° in about 3815 milliseconds and from 252° to 360° in about 985 milliseconds. Therefore, target 58 would be updated every 4.8 seconds. If however, at point 60, the air traffic control cancels all data link activity for the 700 targets, except for surveillance, the total number of data link transactions between 0° to 252° drops from about 2100 transactions to 700 transactions. If each non-surveillance data link transaction required 0.5 milliseconds, then the E-scanned beam would update target 58, 700 milliseconds earlier than the previous scan. Therefore, the predicted target positions for a given azimuth step must be modified prior to initiating data link activity within that step.

There are two aspects to implement the variable-dwell approach to solve potential variations in target updates from scan-to-scan. The first aspect is beneficial for solving both of the considerations mentioned above and involves operation of the rotating E-beam at the same nominal scan period as the radar antenna. For a steady state surveillance/communications environment, this will provide a constant update rate for all targets, in spite of the fact that the instantaneous scan rate varies according to the spatial distribution of the target densities within that nominal scan period. The algorithm which governs dwell time must consider not only surveillance/communication loading requirements, but also the relative position of the E-scanned beam with respect to the mechanically-rotating radar antenna.

Figure 7:
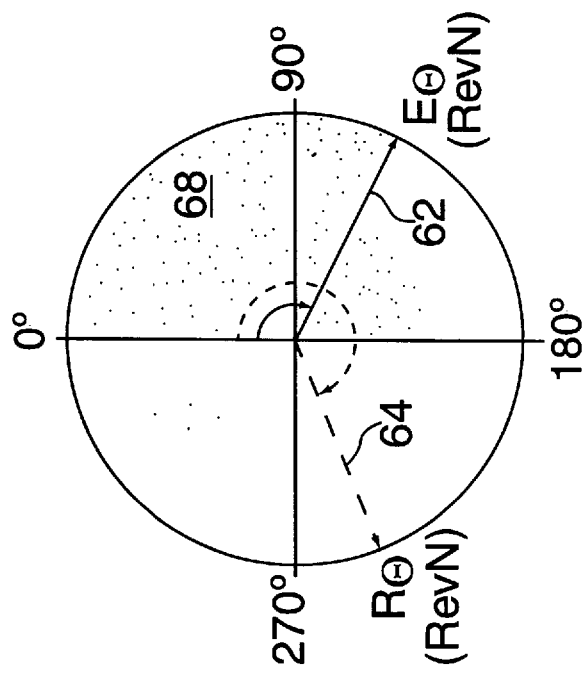
FIG. 7 is a graphical representation of the position of an electronically-scanned beam with respect to a mechanically-scanned radar in a heavily-loaded traffic environment.
Figure 6:
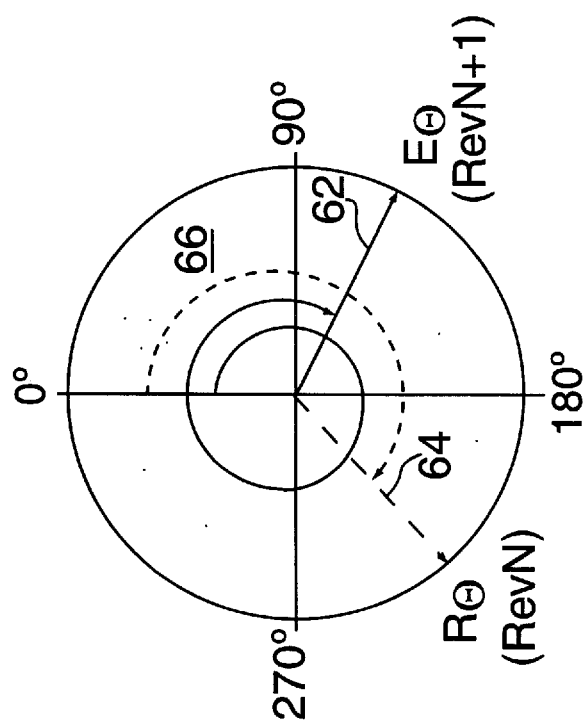
FIG. 6 is a graphical representation of the position of an electronically-scanned beam with respect to a mechanically-scanned radar in a lightly-loaded traffic environment.

FIGS. 6 and 7 illustrate the operational considerations of a fixed-dwell primary radar antenna correlating with a variable-dwell secondary E-scan radar under steady-state conditions. If the scan rate of the E-beam was based only on surveillance/data link loading alone, synchronization between the primary and secondary scan rates would be virtually impossible. FIG. 6 illustrates that the E-beam 62 would lead the radar beam 64 in a lightly-loaded traffic environment 66. FIG. 7 illustrates that the E-beam 62 would lag behind the radar beam 64 in a heavily-loaded traffic environment 68.

The second aspect is to provide correction for the predicted target positions when scan-to-scan update variations about the nominal update period are introduced. This software module must use the actual update time to correct the predicted target positions within the surveillance file prior to interrogating targets for a given beam position.

Figure 8:
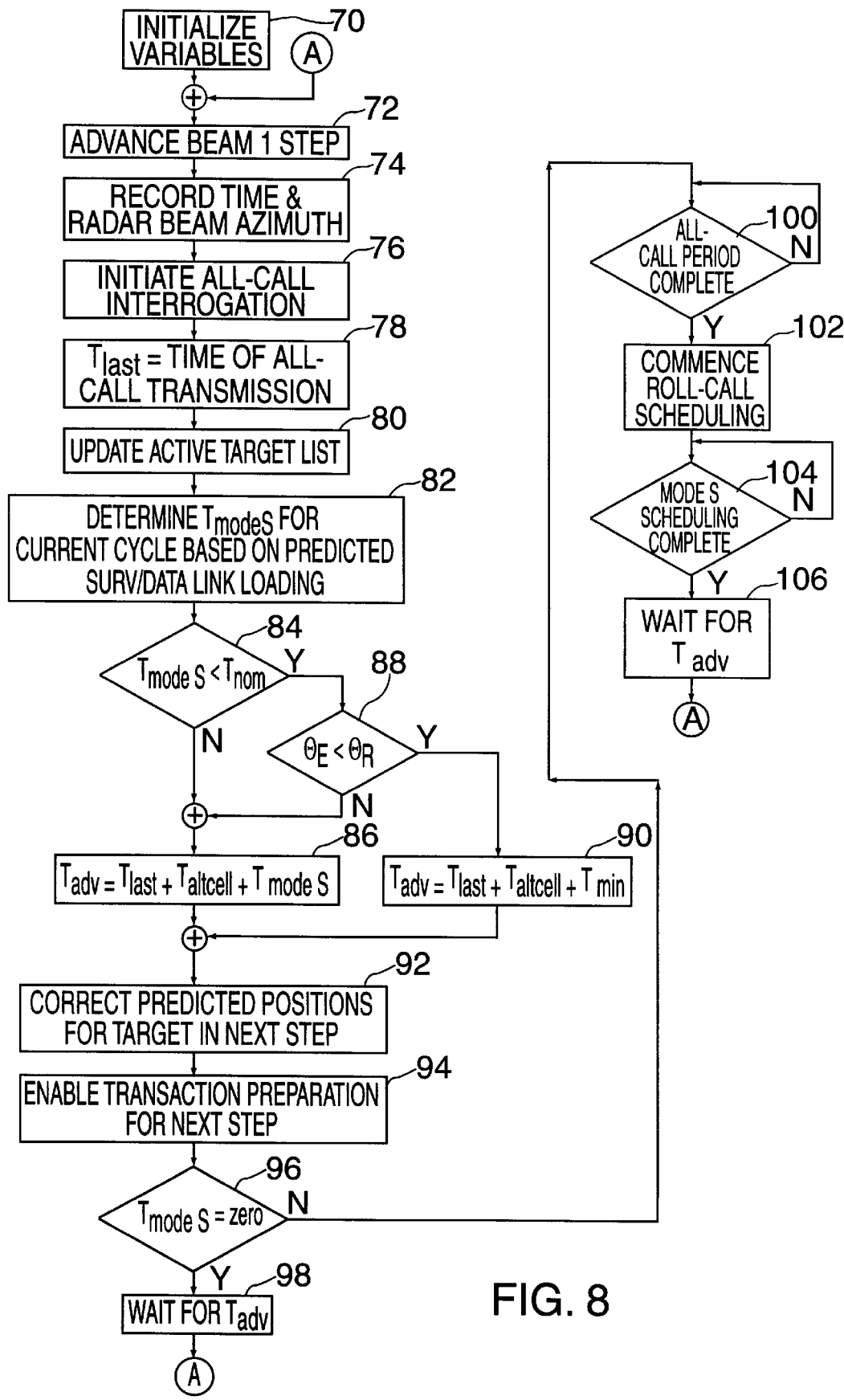
FIG. 8 is a flow diagram for the channel control executive which supports the variable-dwell implementation into an electronically-scanned beam.

Channel management unit 34 (FIG. 2) controls the dwell time of E-beam 64 according to the process summarized in the flow chart of FIG. 8. After initializing variables 70 at the beginning of a scan, the beam is advanced one step 72. Construction begins of a table 74 that records the azimuth of the radar beam 64 of antenna 20 at the time of each advance of the E-beam. The data of the table is used, as described hereinafter, for compensating the azimuth data contained in radar target reports. Substantially simultaneously with the scan advance of the E-beam, an all-call interrogation is initiated 76 and the time of the transmission of the all-call ($T_{last}$) is recorded 78.

The all-call interrogation triggers a response of either altitude or identity from all ATCRBS beacons in the beam and a response only from those Mode S beacons that have not responded to an all-call interrogation during a previous scan. After the first all-call response, the Mode S beacons respond only to selectively addressed interrogations. The active target list 80 is updated and, on the basis of the updated target list 80, the incremental time, $T_{mode\ S}$, required to complete Mode S data transactions at the current E-beam azimuth is determined 82. The number of entries in the active target list is, of course, proportional to the traffic density at the current azimuth.

At 84, $T_{mode\ S}$ is compared with $T_{nom}$, the nominal delay of the radar beam. If $T_{mode\ S}$ is greater than $T_{nom}$, the time $T_{adv}$ at which the E-beam is to be advanced to the next scan step is calculated from the relationship 86: $T_{adv}=T_{last}+T_{allcall}+T_{mode\ S}$, where $T_{allcall}$ is the $T_{mode\ S}$ incremental time required to transmit an ATCRBS interrogation and listen for replies. If $T_{mode\ S}$ is less than $T_{nom}$, providing an opportunity for the E-beam to move more rapidly, the scan angle $\theta_E$ of the E-beam is compared in 88 with the scan angle $\theta_R$ of the radar beam. If $\theta_E$ is less than $\theta_R$, indicating that the E-beam is lagging the radar beam, $T_{adv}$ is calculated from the relationship 90: $T_{adv}=T_{Last}+T_{allcall}+T_{min}$, where $T_{min}$ is the minimum incremental dwell time for the E-beam. If $\theta_E$ is greater than $\theta_R$, then the time for the next scan step is calculated from relationship 86.

After the dwell time for the current E-beam azimuth is calculated, either by the relationship 86 or 90, the azimuth data contained in each of the target reports of the active target list is corrected, at 92, to the target azimuth predicted for the next beam position.

When the correction of the azimuth data of the target reports is complete, preparation of the data transactions to be conducted during the next E-beam step is enabled at 94 and, in decision block 96, the active target list is checked to determine whether any Mode S transactions are scheduled for the current E-beam azimuth. If T-mode S=zero, the program waits, at 98, until the time arrives to advance the E-beam and then returns to 72 to repeat the program.

If $T_{mode\ S}$ does not equal zero, the program determines, at 100, whether the all-call listening period has expired. At the expiration of the all-call listening period, transmission of interrogation signals to selected Mode S targets commences, box 102. Decision block 104 determines whether $T_{mode\ S}$, the time allotted to the conduct of Mode S transactions, has expired. At the expiration of $T_{mode\ S}$ the program waits, at 106, until $T_{adv}$ arrives and then returns to 72 repeat the program.

The second consideration to implement a variable-dwell E-beam in a Mode S application is the effect of the variable-dwell on primary and secondary radar data correlation. Under conditions where the E-scanned beam 62 lags the radar beam 64, the position of a target as reported by the radar and E-beam may differ. As a result, it is necessary to identify which radar report corresponds to a given E-beam report prior to attempting E-beam to radar data correlation.

Referring to FIGS. 3 and 4 as an illustration, the radar beam 64 of antenna 20 scans at a constant rate, regardless of the traffic concentration in any sector. Thus, at the time the E-beam 62 has just passed through sector 52, the radar beam 64 has scanned well beyond sector 52. Generally, when the scan angle $E_\theta$ the E-beam lags the scan angle $R_\theta$ of the radar beam in this manner, a beacon report from a particular aircraft in sector 52 will be received at a later time than the time at which the radar report for the same target was received. In order to correlate the radar report with the beacon report using the correlation algorithms of the above-referenced specification FAA-E-2716, the azimuth of the radar report is adjusted to the azimuth predicted for that aircraft at the time of reception of the beacon report.

Figure 9:
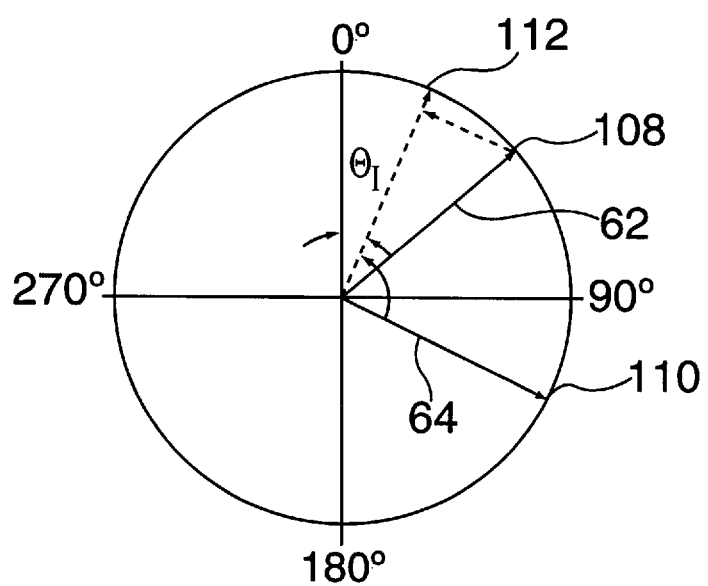
FIG. 9 is a graphical representation of one method for adjusting the primary radar reports for correlation with beacon reports.
Figure 10:
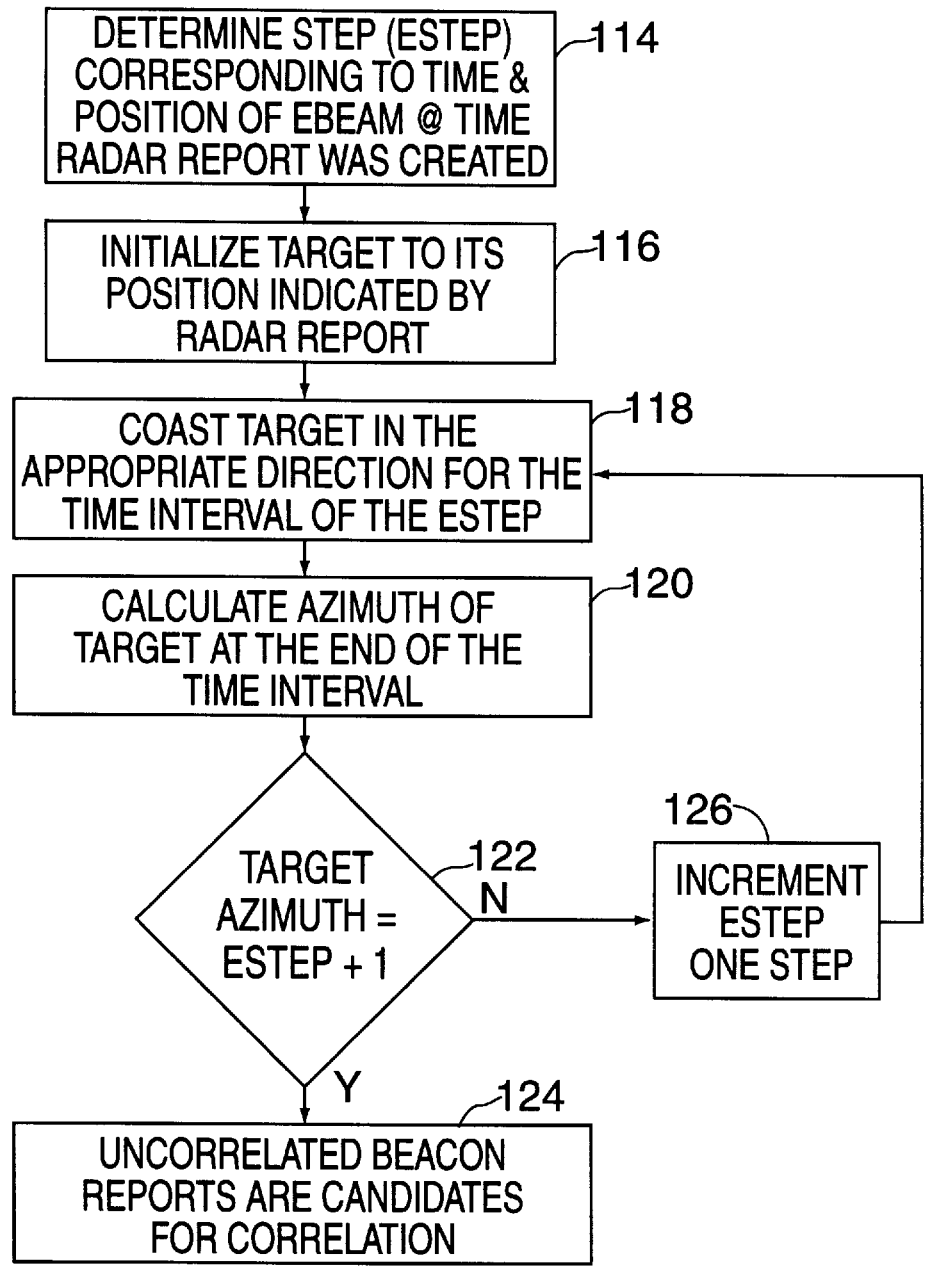
FIG. 10 is a simplified block diagram of the process elements of another method for adjusting the primary radar reports for correlation with beacon reports.

Specifically, this method is illustrated in FIGS. 9 and 10 for two separate occasions as described. During each scan cycle, function 74 (FIG. 8), constructs a Beacon/Radar Correlation Table of the following form:

| STEP | TIME E-BEAM ENTERED STEP ($T_E$) | AZIMUTH OF E-BEAM ($E_\theta$) AT $T_E$ | AZIMUTH OF RADAR BEAM ($R_\theta$) AT $T_E$ |
|---|---|---|---|
| 0 | — | — | — |
| 1 | — | — | — |

-continued

| STEP | TIME E-BEAM ENTERED STEP ($T_E$) | AZIMUTH OF E-BEAM ($E_\theta$) AT $T_E$ | AZIMUTH OF RADAR BEAM ($R_\theta$) AT $T_E$ |
|---|---|---|---|
| 2 | — | — | — |
| . | — | — | — |
| . | — | — | — |
| 599 | — | — | — |

With data from the above table, the azimuths of the radar reports are adjusted by radar-beacon compensation unit 48 (FIG. 2) to azimuth values predicted for the targets at the time the beacon beam scans through the sector in which such targets are located.

It should be noted that the azimuth compensation provided by unit 48, FIG. 2, is separate from and in addition to the correction of the predicted azimuths of target reports performed by function 92, FIG. 8. The compensation performed by unit 48 is for the purpose of facilitating the correlation of radar and beacon reports, described below. The correction of azimuths performed by function 92 is for the purpose of updating the active target list of channel management unit 34 to account for targets that may be entering or leaving the beam at the next beam scan position.

FIG. 9 illustrates the method of correlating track-correlated beacon reports and beacon tracks without beacon reports to primary radar reports. A track-correlated beacon report is a beacon report whose measured target position correlates with the predicted position for that target in a corresponding track file. A beacon track without beacon reports is a track file which has been maintained on a target but, for which, no beacon report has been received for the current scan.

The procedure is to identify the candidate radar report for correlation with a given beacon report scanned at position 108. That is, at position 108, E-beam 62 is receiving a report from a target that was previously scanned by radar beam 64 at position 112. Because of a high-traffic area, E-beam 62 lags radar beam 64, which is currently located at position 110. Therefore, the beacon report does not correlate with the radar report. Using this procedure, the beacon report at position 108 is defined as the baseline data, and a corresponding radar report must be correlated with the baseline. The method consists of first viewing the 360° coverage area as n, n÷1000 azimuth steps. Preferably, n>360, and even more preferably, the 360° coverage area is divided into 600, 0.6 azimuth steps. Upon each E-beam scan advance, channel management control 34 enters the current time the E-beam entered the step and the current radar azimuth at the appropriate step location (0–599) in the Beacon/Radar Correlation Table, above. In order to identify the candidate radar report (or reports, if multiple targets existed at position 112), the target at position 108 is coasted in a counter-clockwise direction (for this example, it is assumed that the target is traveling in a clockwise direction, or positive velocity; the procedure works equally well for a target having a negative velocity)from position 108 at its assumed constant speed, and the radar beam 64 is coasted in a counter-clockwise direction from position 110 at its scan rate until the target and radar beam 64 intersect. The azimuth position at intersection point 112, defined as $\theta_I$, identifies the radar report(s) whose range and azimuth qualify them as candidates for correlation with the beacon report at position 108. The candidate radar report(s) are then updated by coasting the range, altitude and azimuth positions to position 108 using the target velocity values. The beacon report at position 108 is then correlated with the updated radar reports using standard Beacon/Radar correlation procedures.

FIG. 10 illustrates the method of correlating a track-correlated radar report with an uncorrelated beacon report. A track-correlated radar report is a radar report whose measured position correlates with the predicted position in a corresponding radar track file. An uncorrelated beacon report is a beacon report whose measured position does not correlate with the predicted position of any corresponding beacon track files.

Generally, this procedure first determines those uncorrelated beacon reports which are candidates for correlation with a given radar report. The radar report is then modified with coasted azimuth, range and altitude values. Standard Beacon/Radar correlation procedures may then be employed to attempt correlation of the position-compensated radar report with one of the uncorrelated beacon report candidates.

Using this procedure, summarized in the flow chart of FIG. 10, the radar report is defined as the baseline data to determine a candidate set of uncorrelated beacon reports. The objective of the first step is to determine the azimuth step corresponding to the position of the target at the time it was interrogated by E-beam 62. By referring to the Beacon/Radar table, the azimuth of the target in the radar report can be used to determine the step (ESTEP) which corresponds to the time and position of the E-beam at the time of the radar report in block 114. The position of the radar target when the E-beam finally interrogates it will depend upon the initial position and velocity of the target (data contained in the radar report) and the time intervals over which the target must be coasted (determined from the table). After determining ESTEP, the next step is to initialize the target to its position indicated by its radar report in block 116 followed by coasting the target in the appropriate direction (depending on whether the target has a negative or a positive velocity) for the time interval of ESTEP in block 118(the time interval is a function of the amount of targets within ESTEP); calculate the azimuth of the coasted target at the end of the time interval in block 120; and compare the calculated azimuth with the position of the E-beam at ESTEP+1 in block 122. If the azimuths correspond, then the uncorrelated beacon reports found within this azimuth step are candidates for beacon-radar correlation at 124. If the azimuths do not match, then increment ESTEP one step and repeat step 118. Following identification of the candidate uncorrelated beacon reports, the original radar report is updated with its final coasted position. Standard beacon-radar correlation procedures can then be used to attempt to correlate the modified radar report with one of the uncorrelated beacon reports from the candidate set.

It will be understood that the particular embodiments described above are only illustrative of the principles of the present invention, and that various modifications could be made by those skilled in the art without departing from the scope and spirit of the present invention, which is limited only by the claims that follow.

What is claimed is:

1. A method of controlling the scan rate of an electronically-scanned radar beam capable of scanning a range of azimuth sectors comprising:
   a. rotating said beam so that it scans through any given azimuth sector at an approximately constant data rate, whereby said electronically-scanned beam remains in azimuth sectors having high-target densities for extended periods of time and moves rapidly through azimuth sectors having low-target densities.

2. A method of controlling the scan rate of an electronically-scanned antenna of a radar system to provide a variable-dwell time for the beam of said antenna at selected scan angles, said radar conducting data transactions by transmitting interrogation signals to and receiving response signals from transponders within said beam; comprising:

a. determining a first dwell time required at a first scan angle of said antenna for said radar system to conduct data transactions with transponders located within the beam of said antenna at said first scan angle;

b. advancing the scan angle of said antenna to said first scan angle;

c. determining the dwell time required at a second scan angle succeeding said first scan angle for said radar system to conduct data transactions with transponders located within the beam of said antenna at said second scan angle;

d. advancing the scan angle of said beam to said second scan angle upon the expiration of said first dwell time; and e. continuing the steps of determining the dwell time required to conduct data transactions at successive values of scan angles and advancing the scan angle of said beam to a next successive value upon the expiration of the dwell time determined for the scan angle last preceding said next successive value until the entire coverage area of said antenna has been scanned.

3. The method of claim 2, wherein each of said steps of determining the dwell time further includes the steps:

a. limiting said determined dwell time to a maximum value; and b. limiting said determined dwell time to a minimum value;

whereby the time required to completely scan the coverage area of said antenna for each of a plurality of such complete scans remains substantially constant.

4. A method of controlling the scan rate of an electronically-scanned (E-scan) antenna of a secondary radar system to provide a variable-dwell time for the E-beam of said E-scan antenna at selected scan angles, said secondary radar system operating in conjunction with a primary radar system, said primary radar system including a radar antenna having a radar beam that is scanned at a constant angular rate throughout a scan cycle, said secondary radar system conducting data transactions by transmitting interrogation signals to and receiving response signals from transponders within said beam of said E-scan antenna; comprising:

a. determining a first dwell time required at a first scan angle of said E-scan antenna for said secondary radar system to conduct data transactions with transponders located within the beam of said E-scan antenna at said first scan angle;

b. limiting said determined first dwell time to a maximum value and to a minimum value;

c. advancing the scan angle of said E-scan antenna to said first scan angle;

d. determining the dwell time required at a second scan angle succeeding said first scan angle for said secondary radar system to conduct data transactions with transponders located within the beam of said E-scan antenna at said second scan angle;

e. limiting said dwell time determined for said second scan angle to a maximum value and to a minimum value;

f. advancing the scan angle of said beam to said second scan angle upon the expiration of said first dwell time; and g. continuing the steps of determining and limiting the dwell time required to conduct data transactions at successive values of scan angles of said E-scan antenna and advancing the scan angle to a next successive value upon the expiration of the dwell time determined for the scan angle last preceding said next successive value until the entire coverage area of said E-scan antenna has been scanned, said maximum value and said minimum value to which said dwell times are limited, being so selected that the time required for said E-scan antenna to scan said entire coverage area is substantially equal to the time required for said radar antenna to scan said entire coverage area.

5. The method of claim 4 further comprising synchronizing the azimuth position of said E-beam having said variable-dwell time with said radar beam of said primary radar system having a nominal fixed-dwell time during at least one point in time of each radar scan under steady-state conditions.

6. The method of claim 5 wherein said azimuth position of said E-beam and said azimuth position of said radar beam are synchronized at 0°.

7. The method of claim 4 wherein the method of calculating said dwell time of said E-scan antenna comprises:

a. recording the time of a transmission of an all-call interrogation ($T_{last}$) at said first scan angle;

b. determining the number of active targets within said first scan angle;

c. determining the amount of time ($T_{mode\ S}$) to complete Mode S data transactions with said active targets;

d. determining the amount of time ($T_{allcall}$) to transmit an ATCRBS interrogation and listen for replies; and e. comparing $T_{mode\ S}$ to the nominal dwell time of said radar beam at said first scan angle, and if $T_{mode\ S}$ is greater than said nominal dwell time:

i. calculating the time at which said E-beam is to be advanced to said second scan angle from the relationship:

$$T_{adv} = T_{last} + T_{allcall} + T_{mode\ S}$$

and if $T_{mode\ S}$ is less than said nomianl dwell time:

ii. comparing the scan angle of said E-beam to the scan angle of said radar beam, and if said E-beam scan angle is less than said radar beam scan angle:

(1) calculating the time at which said E-beam is to be advanced to said second scan angle from the relationship:

$$T_{adv} = T_{last} + T_{allcall} + T_{min}$$

and if said E-beam scan angle is greater than said radar beam scan angle:

(2) calculating the time at which said E-beam is to be advanced to said second scan angle from the relationship:

$$T_{adv} = T_{last} + T_{allcall} + T_{mode\ S}.$$

8. The method of claim 4 further comprising correlating data from a track-correlated beacon report received from a target in a scan angle to data from a mechanically-scanned radar report received from said target in a different scan angle.

9. The method of claim 8 wherein correlating said beacon report data and said radar report data is comprises:

a. dividing a 360° coverage area into n, n÷1000 scan steps;

b. advancing said E-scanned radar beam through each scan step;

c. entering the current time said E-beam enters each of said scan steps and the current radar beam azimuth at each of said scan steps in a correlation table;

d. coasting said target in a direction opposite its traveling velocity direction at its assumed constant speed;

e. coasting said radar beam in said direction at its scan rate;

f. determining the azimuth of intersection of said coasted target and said coasted radar beam;

g. identifying the radar report(s) at said azimuth of intersection whose range and azimuth qualify them as candidates for correlation with the beacon report;

h. updating the candidate radar reports by coasting range, altitude, and azimuth positions using radar report velocity values or beacon track velocity values; and i. correlating the beacon report with coasted radar report(s).

10. The method of claim 9 wherein n=600.

11. The method of claim 4 further comprising correlating data from a track-correlated radar report received from a target in a scan angle to data from from an uncorrelated beacon report received from said target in a different scan angle.

12. The method of claim 11 wherein correlating said beacon report data and said radar report data comprises:

a. dividing a 360° coverage area into n, n÷1000 scan steps;

b. advancing said E-scanned radar beam through each scan step;

c. entering the current time said E-beam enters each of said scan steps and the current radar beam azimuth at each of said scan steps in a correlation table;

d. determining the scan step which corresponds to the time and position of said E-beam at the time of said radar report;

e. initializing said target to the azimuth position of said radar report;

f. coasting said target in a direction opposite its traveling velocity direction at its assumed constant for the time interval of said scan angle in (d);

g. determining the scan step for which the azimuth of said coasted radar target corresponds with said scan step of (d), wherein the result of this search gives the step which could contain the candidate beacon reports for correlation with the coasted radar report; and h. correlating the uncorrelated beacon report(s) found within that step with the coasted radar report.

13. An apparatus for controlling the scan rate of an electronically-scanned antenna of a radar system to provide a variable-dwell time for the beam of said antenna at selected scan angles, said radar conducting data transactions by transmitting interrogation signals to and receiving response signals from transponders within said beam; comprising:

a. means for determining a first dwell time required at a first scan angle of said antenna for said radar system to conduct data transactions with transponders located within the beam of said antenna at said first scan angle;

b. means for advancing the scan angle of said antenna to said first scan angle;

c. means for determining the dwell time required at a second scan angle succeeding said first scan angle for said radar system to conduct data transactions with transponders located within the beam of said antenna at said second scan angle;

d. means for advancing the scan angle of said beam to said second scan angle upon the expiration of said first dwell time; and e. means for continuing the steps of determining the dwell time required to conduct data transactions at successive values of scan angles and means for advancing the scan angle of said beam to a next successive value upon the expiration of the dwell time determined for the scan angle last preceding said next successive value until the entire coverage area of said antenna has been scanned.

14. The apparatus of claim 13 further comprising means for correlating data from a track-correlated beacon report received from a target in a scan angle to data from a mechanically-scanned radar report received from said target in a different scan angle.

15. The apparatus of claim 13 further comprising means for correlating data from a track-correlated radar report received from a target in a scan angle to data from an uncorrelated beacon report received from said target in a different scan angle.

16. A method of controlling the scan rate of an electronically-scanned radar beam through a coverage area comprising a range of azimuth sectors, the method comprising rotating said beam at a variable angular rate through said sectors as a function of the target density of each of said sectors.

17. The method of claim 16 further comprising rotating said beam at a substantially constant angular rate through said coverage area.

18. A method of controlling the scan rate of an electronically-scanned radar beam through a coverage area comprising a range of azimuth sectors, the method comprising rotating said beam at a variable angular rate through each sector to maintain a substantially equal update rate for all targets.

19. A radar system comprising:

(a) a primary surveillance mechanical radar for scanning in azimuth at a constant angular scan rate through a scan cycle;

(b) a secondary surveillance electronic radar for scanning in azimuth through said scan cycle;

(c) first control means for scanning said secondary radar through any given azimuth at an approximately constant data rate so that the average scan rate of said secondary radar is equal to the scan rate of said primary radar; and (d) second control means for coinciding the azimuths of said primary radar and said secondary radar;

whereby said secondary radar remains in azimuth sectors having high-target densities for extended periods of time and rapidly moves through azimuth sectors having low-target densities and said primary and said secondary radar coincide in the same azimuth at least once during said scan cycle.

20. The radar system of claim 19 wherein said second control means coincide the azimuths of said primary radar and said secondary radar at the beginning of said scan cycle.

* * * * *